United States Patent
Wei

(10) Patent No.: US 7,720,093 B2
(45) Date of Patent: May 18, 2010

(54) MODULATION MULTIPLEXING

(75) Inventor: Yongbin Wei, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1836 days.

(21) Appl. No.: 10/269,784

(22) Filed: Oct. 10, 2002

(65) Prior Publication Data

US 2004/0071158 A1    Apr. 15, 2004

(51) Int. Cl.
*H04J 15/00* (2006.01)
*H04J 11/00* (2006.01)

(52) U.S. Cl. .................... 370/464; 370/203; 370/206

(58) Field of Classification Search ............... 370/464, 370/203, 329, 345, 468, 206, 461; 375/261, 375/298

See application file for complete search history.

(56) References Cited

U.S. PATENT DOCUMENTS

| | | | | |
|---|---|---|---|---|
| 5,214,656 A | * | 5/1993 | Chung et al. ............... 714/758 |
| 5,469,431 A | * | 11/1995 | Wendorf et al. ............ 370/254 |
| 5,825,829 A | * | 10/1998 | Borazjani et al. .......... 375/308 |
| 6,195,797 B1 | * | 2/2001 | Williams, Jr. ............... 725/74 |
| 6,259,443 B1 | * | 7/2001 | Williams, Jr. ............... 715/741 |
| 6,429,737 B1 | * | 8/2002 | O'Brien ...................... 330/10 |
| 6,473,467 B1 | * | 10/2002 | Wallace et al. ............. 375/267 |
| 6,510,173 B1 | * | 1/2003 | Garmonov et al. ......... 375/141 |
| 6,732,281 B1 | * | 5/2004 | Mantri et al. ............... 713/300 |
| RE39,111 E | * | 5/2006 | Oshima ....................... 386/46 |
| 7,093,187 B2 | * | 8/2006 | Cameron et al. ............ 714/792 |
| 7,116,722 B2 | * | 10/2006 | Foschini et al. ............ 375/267 |
| 7,116,724 B2 | * | 10/2006 | You ............................ 375/267 |
| 7,283,501 B2 | * | 10/2007 | Cayla et al. ................. 370/336 |
| 2002/0040460 A1 | * | 4/2002 | Choi et al. ................... 714/755 |
| 2003/0193889 A1 | * | 10/2003 | Jacobsen .................... 370/208 |

* cited by examiner

*Primary Examiner*—Ayaz R. Sheikh
*Assistant Examiner*—Blanche Wong
(74) *Attorney, Agent, or Firm*—Larry J. Moskowitz

(57) ABSTRACT

Systems and techniques are disclosed relating to communications. The systems and techniques involve communicating over a physical channel having a plurality of modulation channels each having a channel capacity by allocating a plurality of data streams among the modulation channels as a function of the channel capacity for each of the modulation channels, and modulating the data streams to support transmission over the physical channel as a function of the data stream allocation among the modulation channels. It is submitted with the understanding that it will not be used to interpret or limit the scope or the meaning of the claims.

52 Claims, 2 Drawing Sheets

MODULATION MULTIPLEXING

FIELD

The present invention relates generally to communications, and more specifically, to modulation multiplexing systems and techniques.

BACKGROUND

Wireless and wire-line communications utilize electromagnetic waves propagated through free space or media to transport information. The electromagnetic waves are generally high frequency sinusoidal signals encoded with the information. The process of encoding the information onto the sinusoidal signal is called modulation.

Advanced modulation techniques have been developed over the years to increase the bandwidth efficiency of communications. Digital modulation is one such technique. Digital modulation refers to the process of representing a digital data stream by modulating a sinusoidal signal. Typically, fixed length sinusoidal signals known as symbols are used to represent multiple binary values of the digital data stream. This can be accomplished by varying the amplitude, phase and/or frequency of the sinusoidal signal to generate a symbol with M signal states capable of representing n values where $M=2^n$.

The performance of a digital modulation system can be measured by the ability of a receiver to correctly recognize the transmitted symbols in the presence of noise and other disturbances. Noise can enter the receiver through the antenna along with the symbols, or it can be generated within the receiver itself. The ratio of the symbol (or signal) strength to the noise level is called the signal-to-noise ratio (SNR). If the SNR is high few errors will occur. However, as the SNR reduces, the noise may cause the symbols to be demodulated at the receiver incorrectly, and errors will occur. The bit error rate (BER) is often used as a measure of these errors. Typically, the BER is used by those skilled in the art as a design parameter, which defines the minimum quality of service. This design parameter can then be used to determine the SNR and modulation scheme needed to meet the quality of service requirements.

With the tremendous increase in wireless applications over the past years, there has been a desire to design more bandwidth efficient systems to increase user capacity. However, with increases in bandwidth efficiency comes reduced noise immunity. This reduction in noise immunity tends to increase the BER beyond an acceptable level to meet the minimum quality of service requirements. Accordingly, there is a need for modulation techniques with better noise performance for improved user capacity without sacrificing quality of service.

SUMMARY

In one aspect of the present invention, a method of communications over a physical channel having a plurality of modulation channels each having a channel capacity includes allocating a plurality of data streams among the modulation channels as a function of the channel capacity for each of the modulation channels, and modulating the data streams to support transmission over the physical channel as a function of the data stream allocation among the modulation channels.

In another aspect of the present invention, an apparatus configured to communicate over a physical channel having a plurality of modulation channels each having a channel capacity includes a data source configured to allocate a plurality of data streams among the modulation channels as a function of the channel capacity for each of the modulation channels, and a modulator configured to modulate the data streams to support transmission over the physical channel as a function of the data stream allocation among the modulated channels.

In yet another aspect of the present invention, an apparatus configured to communicate over a physical channel having a plurality of modulation channels each having a channel capacity includes means for allocating a plurality of data streams among the modulation channels as a function of the channel capacity for each of the modulation channels, and means for modulating the data streams to support transmission over the physical channel as function of the data stream allocation among the modulated channels.

In a further aspect of the present invention, computer readable media embodying a program of instructions executable by a computer program performs a method of communications over a physical channel having a plurality of modulation channels each having a channel capacity, the method including allocating a plurality of data streams among the modulation channels as a function of the channel capacity for each of the modulation channels, and modulating the data streams to support transmission over the physical channel as a function of the data stream allocation among the modulation channels.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Digital modulation often employs a signal constellation mapper to translate n number of binary values into a signal space of $2^n$ points. The binary values can be fundamental units of information such as binary bits, or alternatively, can be symbols generated by a coding process, or chips generated by a spreading process in spread spectrum communications. A signal constellation exists in k-dimensional space with M signal points each representing a unique set of n binary values. For example, binary phase shift keying (BPSK) uses a one-dimensional constellation consisting of a line with two signal points separated by 180°. A sinusoidal signal, often referred to as the carrier signal, can be shifted in phase between 0° and 180° depending on the state of each binary value.

Figure 1A:
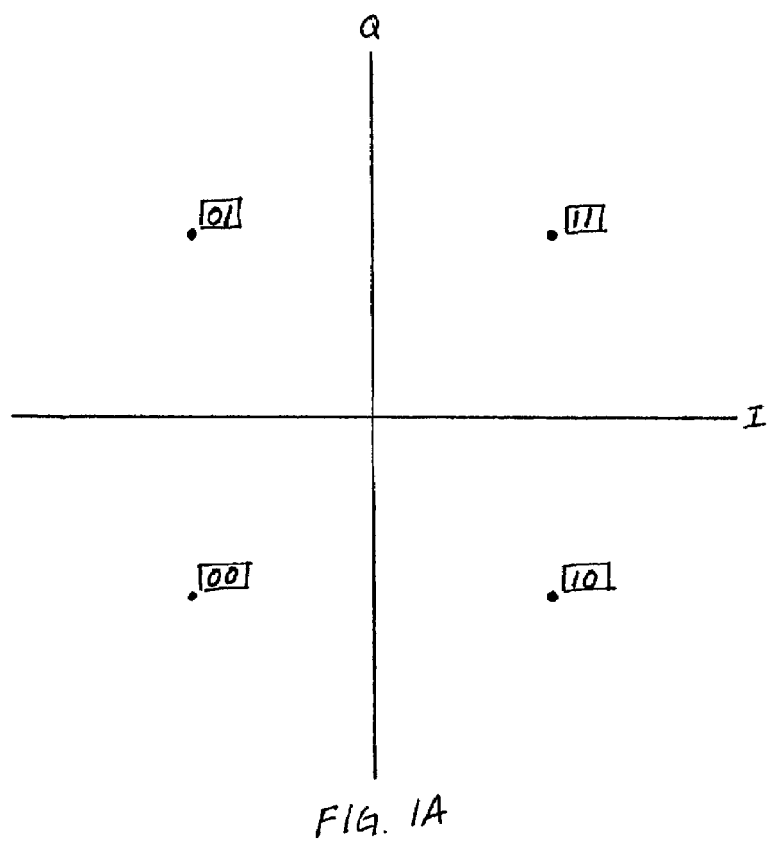
FIG. 1A is an exemplary two-dimensional diagram for a quadrature phase shift keying (QPSK) constellation.

Increased bandwidth efficiency can be achieved by mapping multiple binary values to each symbol. FIG. 1A is an exemplary two-dimensional diagram for a quadrature phase shift keying (QPSK) constellation wherein two binary values are mapped to each of the M signal points. Two-dimensional modulation schemes require two coordinates to specify the position of the signal point in the constellation. These coordinates are referred to as quadrature components, or I-Q components, having both phase and amplitude information. These quadrature components can be modulated onto two orthogonal carrier signals having the same frequency but separated in phase by 90°. With this approach, the number of binary values that can be represented by each symbol is double as compared to a single carrier signal.

Figure 1B:
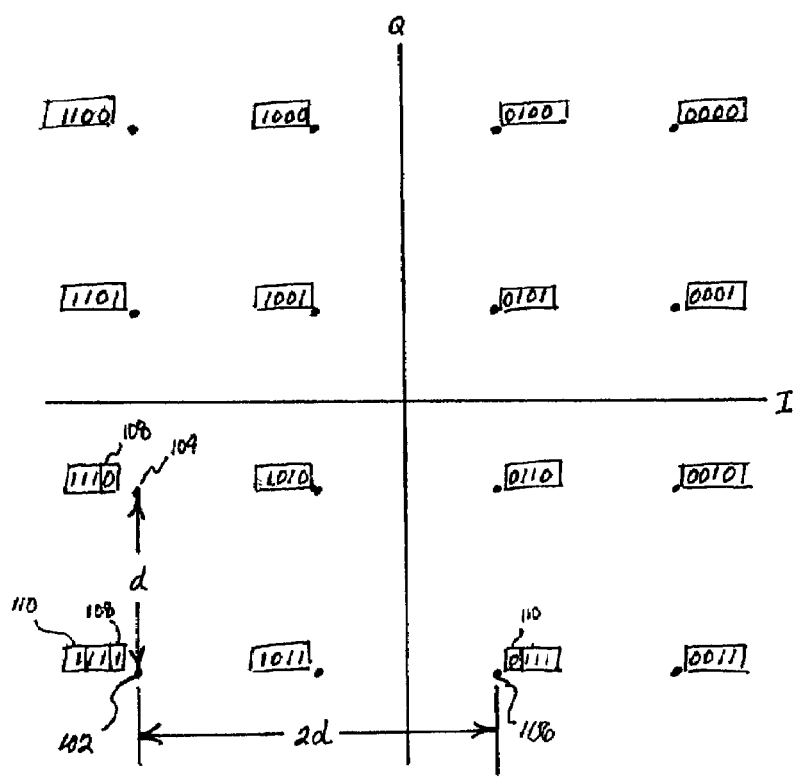
FIG. 1B is an exemplary two-dimensional diagram for a 16 quadrature amplitude modulation (QAM) constellation.

Higher order modulation (other than BSPK and QPSK) such as 8-PSK, 16 quadrature amplitude modulation (QAM) and 64-QAM can be used to further improve the bandwidth efficiency of the communications system. FIG. 1B is an exemplary diagram of a 16-QAM constellation with phase and amplitude variations. The 16-QAM constellation maps four binary values to each symbol making it more bandwidth efficient than the QPSK constellation shown in FIG. 1A. However, the 16-QAM constellation has less spacing between signal points than the QPSK constellation making it is more susceptible to noise.

Figure 2A:
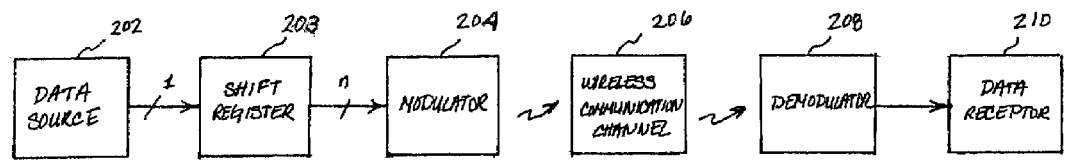
FIG. 2A is a conceptual block diagram of an exemplary wireless communications system with digital modulation.

Digital modulation in a wireless communications system is shown in FIG. 2A. Constellation mapping can performed in a modulator 204 before baseband filtering and upconversion to the carrier frequency. A shift register 203 can be used to convert a serial digital data stream from a data source 202 to an n-wide parallel digital data stream. Alternatively, the shift register 203 can be omitted and the data source 202 can be used to segment the data into an n-wide parallel digital data stream. The data source 202 can be a convolutional encoder to provide forward error correction at the receiver, or any other data source known in the art. In any event, the modulator 204 maps the n-wide parallel digital data stream to coordinates in the signal constellation. The coordinates of each signal point in the two-dimensional signal constellation represents the baseband quadrature components that are used to modulate the orthogonal carrier signals before transmission over a wireless communications channel 206.

Constellation demapping is performed in a demodulator 208 and involves the translation of the demodulated quadrature components back to the correct coordinates in the signal constellation. Because of noise and other disturbances in the communications channel, the coordinates may not correspond to the exact location of a signal point in the original constellation. Using a hard or soft demodulation process, the constellation demapper can detect which symbol was most likely transmitted. Hard demodulation involves finding the smallest distance between the received point and the location of a valid symbol in the signal constellation. Soft demodulation, on the other hand, involves computing the likelihood of every valid symbol in the signal constellation based on the received point. For hard demodulation, the demodulator 208 demaps the coordinates into a digital data stream and provides the digital data stream to a data receptor 210. For soft demodulation, the demodulator 208 provides the likelihood values to the data receptor 210.

Figure 2B:
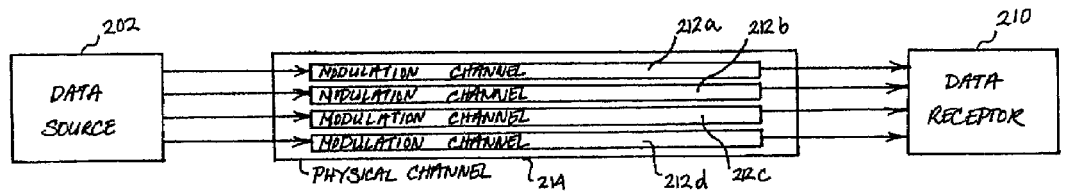
FIG. 2B is a conceptual block diagram of the exemplary wireless communications system of FIG. 2A using a physical channel model.

The spacing between the signal points in a constellation has a direct impact on the BER. If the spacing between signal points become to small, noise can cause the receiver to determine that an adjacent symbol was transmitted instead of the one actually transmitted. To improve noise performance, the n binary values assigned to each symbol can be mapped such that adjacent symbols within the constellation differ by only one binary value. With this approach, if the receiver incorrectly demodulates a symbol, it is likely that only one of the binary values in the symbol is in error. This mapping scheme, known as Gray mapping, is shown in FIG. 2B with each n-wide binary value mapped to its corresponding signal point within the constellation.

Further improvements in noise performance may be realized by controlling the relative position of the n-wide binary values applied to the constellation signal mapper. A simple example can used to illustrate this concept. As seen from FIG. 1B, a symbol 102 is assigned to represent binary values "1111" in a 16-QAM constellation with Gray mapping. The least significant value 108 is toggled when the symbol 104 assigned to represent binary values "1110" is selected. These two symbols 102 and 104 are spaced apart by a distance d, the minimum distance between symbols within the constellation. Therefore, the noise margin of the least significant value for the transmitted symbol mapped from the n-wide binary value of "1711" is ½ d. The most significant value 110, on the other hand, does not toggle unless a symbol is selected that is at least a distance 2d away, i.e, the symbol 106 assigned to represent binary values "0111." Therefore, the noise margin of the most significant value for the transmitted symbol mapped from the n-wide binary value of "1111" is d. Accordingly, the symbol 102 in a 16-QAM constellation with Gray mapping which is mapped from an n-wide binary value of "1111" has a most significant value with twice the noise immunity of the least significant value. A more complex analysis, which considers all signal points within the constellation, confirms that statistically the most significant value is less susceptible to noise than the least significant value. This analysis may vary depending on the specific modulation scheme and constellation map, and those skilled in the art will be readily able to perform the analysis empirically, mathematically, by simulation or by any other means known in the art based on the teachings throughout this disclosure.

A signal constellation mapper which translates n number of binary values into signal space of $2^n$ points can be thought of as having n modulation channels. Applying this concept to the wireless communications system of FIG. 2A, a physical channel carrying n modulation channels can be used to connect the data source 202 to the data receptor 210. The concept of a modulation channel is shown in FIG. 2B. If the modulation channels 212a-d carried by the physical channel 214 are formed from a 16-QAM constellation with Gray mapping, there will be 4-modulation channels, one modulation channel coupled to each output of the data source 202. To illustrate this concept with reference to the 16-QAM constellation map of FIG. 1B, each symbol is mapped from a sequence comprising one binary value from each modulation channel. For example, the binary value of "0" from the first modulation channel and the binary value of "1" from the second through fourth modulation channels are combined to create a sequence of "1110" to identify the symbol 104 within the constellation. Similarly, the binary value of "0" from the fourth modulation channel and the binary value of "1" from the first through third modulation channels are combined to create a sequence of "0111" to identify the symbol 106 within the constellation.

Depending on the modulation scheme and the constellation map, the modulation channels may exhibit different susceptibilities to noise. For those modulation channels with high noise immunity, higher bandwidth efficiency can be obtained without increasing the BER to an unacceptable level. This relationship can be used to define a quality parameter known as the channel capacity. The channel capacity of a modulation channel can be defined by the highest bandwidth efficiency that can be obtained. With a fixed transmission power, the higher the channel capacity, the less likely the received BER exceeds the maximum BER required to support the minimum quality of service. Should the modulation channels exhibit different channel capacities, the data source 202 can be used to allocate the digital data stream to different modulation channels 212a-d to optimize the overall throughput of the system. The concept of allocating data to different modulation channels based on some criteria will be referred to as modulation multiplexing. The manner in which the serial digital data stream is allocated to the modulation channels 212a-d and the criteria used for such allocation can take on virtually any form depending on the specific communications application and the overall design constraints.

Figure 3:
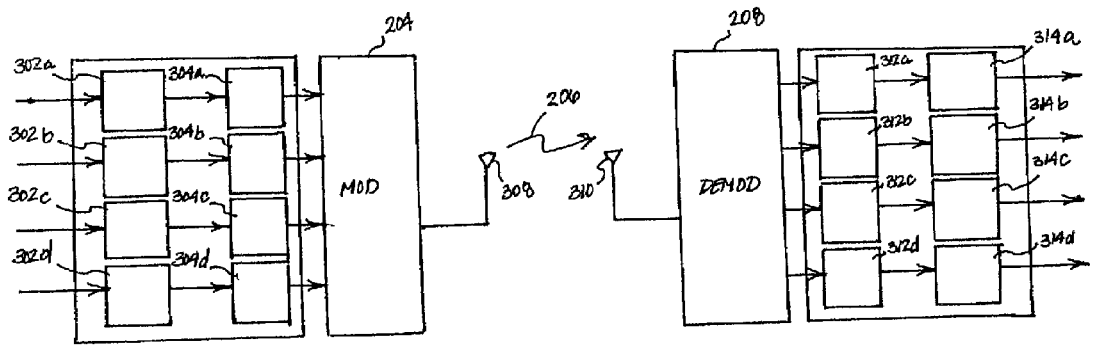
FIG. 3 is a functional block diagram of an exemplary wireless communications system with digital modulation in combination with a multiple encoder arrangement.

An exemplary application of modulation multiplexing will be explained in connection with a multiple encoder arrangement as shown in FIG. 3. In this example, the data source 202 can be implemented with a separate convolutional encoder 302a-d for each modulation channel 212a-d. In contrast to a single encoder implementation whose coding rate is limited by the lowest capacity modulation channel, each convolutional encoder 302a-d can be operated at a different coding rate depending on the channel capacity of its respective modulation channel. For example, in a single encoder implementation, a coding rate of ⅕ may be the maximum allowable coding rate to support the lowest capacity modulation channel. However, a coding rate of ½ may be acceptable for a higher capacity modulation channel. By increasing the coding rate on higher capacity modulation channels, the overall throughput of the system can be increased.

Implementing an interleaver process may further increase the overall throughput of the system. Interleaving tends to randomly distribute errors that occur in blocks due to fading, and therefore, reduces the BER. To accomplish this objective, the data source 202 may also be configured with a separate interleaver 304a-d for each modulation channel to scramble the encoded values before modulation. The modulator 204 maps a sequence comprising a binary value from each modulation channel to a signal point in the constellation using a look-up table (not shown) or other means known in the art. The coordinates of the signal point represents the baseband quadrature components that are used to modulate the orthogonal carrier signals before transmission over the wireless communications channel 206 via an antenna 308.

At the receiver, an antenna 310 can be positioned to couple the transmission propagating in free space to the demodulator 208. The demodulator 208 recovers the baseband quadrature components from the orthogonal carrier signals, and translates them back into the correct coordinates in the signal constellation using either a hard or soft demodulation process. Next, the parallel digital data stream is segmented into 4-modulation channels. A de-interleaver 312a-d can be positioned in each modulation channel to descramble the demodulated values before decoding. A decoder 314a-d can also be provided in each modulation channel to recover the original information.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a plurality of data streams over a physical channel having a plurality of modulation channels each having a channel capacity, comprising:

allocating the plurality of data streams among the plurality of modulation channels as a function of the channel capacity for each of the modulation channels;

encoding the plurality of data streams using encoder rates varying as a function of the channel capacity for each of the modulation channels, each data stream of the plurality of data streams being encoded with an encoder rate corresponding to the channel capacity of the modulation channel to which said each data stream is allocated; and modulating the plurality of encoded data streams using a signal constellation mapper, thereby obtaining a plurality of modulated data streams to transmit over the physical channel;

wherein the signal constellation mapper translates n number of binary values into a multi-dimensional constellation space of $2^n$ points, n being an integer, and wherein the step of modulating further comprises mapping each modulation channel of the plurality of modulation channels to one of the $2^n$ points.

2. The method of claim 1 further comprising modulating a carrier as a function of the modulated data streams.

3. The method of claim 2 wherein the data streams each comprises a plurality of values, and the modulated data streams comprise a plurality of modulated values each being generated from an n-wide binary value sequence comprising in a predetermined order one value from each of the modulation channels.

4. The method of claim 3 wherein the modulated values each comprises phase information, the carrier being modulated as a function of the phase information.

5. The method of claim 4 wherein the modulated values each comprises amplitude information, the carrier being modulated as a function of the amplitude information.

6. The method of claim 3 wherein the modulated values each comprises a quadrature value, and wherein the carrier modulation comprises quadrature modulation.

7. The method of claim 1 wherein the allocation of data streams comprises allocating a first one of the data streams to a first one of the modulation channels.

8. The method of claim 1 wherein the allocation of data streams comprises allocating each of the data streams to a different one of the modulation channels.

9. The method of claim 1 wherein the encoding of data streams comprises encoding a first one of the data streams at a first encoder rate and a second one of the data streams at a second encoder rate different from the first encoder rate.

10. The method of claim 9 wherein the first encoder rate is higher than the second encoder rate, the first one of the data streams being allocated to a first one of the modulation channels and the second one of the data streams being allocated to a second one of the modulation channels, the first one of the modulation channels having a higher channel capacity than the second one of the modulation channels.

11. The method of claim 1 wherein the encoded data streams each comprises a plurality of encoded values, the method further comprising interleaving the values within each of the encoded data streams.

12. The method of claim 1 wherein at least two of the modulation channels exhibit different channel capacities.

13. An apparatus configured to transmit a plurality of data streams over a physical channel having a plurality of modulation channels each having a channel capacity, comprising:
a data source configured to allocate the plurality of data streams among the plurality of modulation channels as a function of the channel capacity for each of the modulation channels;
a plurality of encoders configured to encode the plurality of data streams using encoder rates varying as a function of the channel capacity for each of the modulation channels, each data stream of the plurality of data streams being encoded with an encoder rate corresponding to the channel capacity of the modulation channel to which said each data stream is allocated;
a modulator configured to modulate the plurality of encoded data streams, thereby obtaining a plurality of modulated data streams to transmit over the physical channel, the modulator comprising a signal constellation mapper configured to translate n number of binary values into a multi-dimensional constellation space of $2^n$ points, n being an integer, the constellation mapper being further configured to map each modulation channel of the plurality of modulation channels to one of the $2^n$ points.

14. The apparatus of claim 13 further comprising a transmitter configured to modulate a carrier as a function of the modulated data streams.

15. The apparatus of claim 14 wherein the data streams each comprises a plurality of values, and wherein the modulated data streams comprise a plurality of modulated values each being generated from an n-wide binary value sequence comprising in a predetermined order one value from each of the modulation channels.

16. The apparatus of claim 15 wherein the modulated values each comprises phase information, the carrier being modulated as a function of the phase information.

17. The apparatus of claim 16 wherein the modulated values each comprises amplitude information, the carrier being modulated as a function of the amplitude information.

18. The apparatus of claim 15 wherein the modulated values each comprises a quadrature value, and wherein the carrier modulation comprises quadrature modulation.

19. The apparatus of claim 13 wherein the data source is configured to allocate a first one of the data streams to a first one of the modulation channels.

20. The apparatus of claim 13 wherein the data source is configured to allocate each of the data streams to a different one of the modulation channels.

21. The apparatus of claim 13 wherein a first one of the encoders is configured to encode a first one of the data streams at a first encoder rate and a second one of the encoders is configured to encode a second one of the data streams at a second encoder rate different from the first encoder rate.

22. The apparatus of claim 21 wherein the first encoder rate is higher than the second encoder rate, the first one of the data streams being allocated to a first one of the modulation channels and the second one of the data streams being allocated to a second one of the modulation channels, the first one of the modulation channels having a higher channel capacity than the second one of the modulation channels.

23. The apparatus of claim 13 wherein the encoded data streams each comprises a plurality of encoded values, the apparatus further comprising a plurality of interleavers each configured to interleave the values within one of the encoded data streams.

24. The apparatus of claim 13 wherein at least two of the modulation channels exhibit different channel capacities.

25. An apparatus configured to transmit a plurality of data streams over a physical channel having a plurality of modulation channels each having a channel capacity, comprising:
means for allocating the plurality of data streams among the plurality of modulation channels as a function of the channel capacity for each of the modulation channels;
means for encoding the plurality of data streams using encoder rates varying as a function of the channel capacity for each of the modulation channels, each data stream of the plurality of data streams being encoded with an encoder rate corresponding to the channel capacity of the modulation channel to which said each data stream is allocated;
means for modulating the plurality of encoded data streams, thereby obtaining a plurality of modulated data streams to transmit over the physical channel, the means for modulating comprising means for signal constellation mapping configured to translate n number of binary values into a multi-dimensional constellation space of $2^n$ points, n being an integer, the constellation mapper being further configured to map each modulation channel of the plurality of modulation channels to one of the $2^n$ points.

26. The apparatus of claim 25 further comprising means for modulating a carrier as a function of the modulated data streams.

27. The apparatus of claim 26 wherein the data streams each comprises a plurality of values, and wherein the modulated data streams comprises a plurality of modulated values each being generated from an n-wide binary value sequence comprising in a predetermined order one value from each of the modulation channels.

28. The apparatus of claim 27 wherein the modulated values each comprises phase information, the carrier being modulated as a function of the phase information.

29. The apparatus of claim 28 wherein the modulated values each comprises amplitude information, the carrier being modulated as a function of the amplitude information.

30. The apparatus of claim 27 wherein the modulated values each comprises a quadrature value, and wherein the carrier modulation comprises quadrature modulation.

31. The apparatus of claim 26 wherein the means for allocating the data streams among the modulation channels is configured to allocate a first one of the data streams to a first one of the modulation channels.

32. The apparatus of claim 26 wherein the means for allocating the data streams among the modulation channels is configured to allocate each of the data streams to a different one of the modulation channels.

33. The apparatus of claim 25 wherein the means for encoding each of the data streams is configured to encode a first one of the data streams at a first encoder rate and a second one of the data streams at a second encoder rate different from the first data encoder rate.

34. The apparatus of claim 33 wherein the first encoder rate is higher than the second encoder rate, the first one of the data streams being allocated to a first one of the modulation channels and the second one of the data streams being allocated to a second one of the modulation channels, the first one of the modulation channels having a higher channel capacity than the second one of the modulation channels.

35. The apparatus of claim 25 wherein the encoded data streams each comprises a plurality of encoded values, the apparatus further comprising means for interleaving the values within each of the encoded data streams.

36. The apparatus of claim 25 wherein at least two of the modulation channels exhibit different channel capacities.

37. Computer readable media embodying a program of instructions executable by a computer to perform a method of transmitting a plurality of data streams over a physical channel having a plurality of modulation channels each having a channel capacity, the method comprising:
  allocating the plurality of data streams among the plurality of modulation channels as a function of the channel capacity for each of the modulation channels;
  encoding the plurality of data streams using encoder rates varying as a function of the channel capacity for each of the modulation channels, each data stream of the plurality of data streams being encoded with an encoding rate corresponding to the channel capacity of the modulation channel to which said each data stream is allocated; and
  modulating the plurality of encoded data streams using a signal constellation mapper, thereby obtaining a plurality of modulated data streams to transmit over the physical channel;
  wherein the signal constellation mapper translates n number of binary values into a multi-dimensional constellation space of $2^n$ points, n being an integer, and wherein the step of modulating further comprises mapping each modulation channel of the plurality of modulation channels to one of the $2^n$ points.

38. The computer readable media of claim 37 wherein the data streams each comprises a plurality of values, and the modulated data streams comprises a plurality of modulated values each being generated from a sequence comprising one value from each of the modulation channels.

39. The computer readable media of claim 38 wherein the modulated values each comprises phase information.

40. The computer readable media of claim 39 wherein the modulated values each comprises amplitude information.

41. The computer readable media of claim 38 wherein the modulated values each comprises a quadrature value.

42. The computer readable media of claim 37 wherein the allocation of data streams comprises allocating a first one of the data streams to a first one of the modulation channels.

43. The computer readable media of claim 37 wherein the allocation of data streams comprises allocating each of the data streams to a different one of the modulation channels.

44. The computer readable media of claim 37, wherein the encoding of data streams comprises encoding a first one of the data streams at a first encoder rate and a second one of the data streams at a second encoder rate different from the first data rate.

45. The computer readable media of claim 44 wherein the first encoder rate is higher than the second encoder rate, the first one of the data streams being allocated to a first one of the modulation channels and the second one of the data streams being allocated to a second one of the modulation channels, the first one of the modulation channels having a higher channel capacity than the second one of the modulation channels.

46. The computer readable media of claim 44 wherein the encoded data streams each comprises a plurality of encoded values, the method further comprising interleaving the values within each of the encoded data streams.

47. The computer readable media of claim 37 wherein at least two of the modulation channels exhibit different channel capacities.

48. A method of transmitting over a physical channel from a transmitter to a receiving device, the method comprising:
  translating n-wide binary value sets using a signal constellation mapper at the transmitter into a plurality of point representations in a multi-dimensional constellation space, wherein n is an integer and each point in the multi-dimensional constellation space represents a unique n-wide binary value set;
  allocating at least one data stream among a plurality of modulation channels at the transmitter based on the channel capacity of each modulation channel of the plurality of modulation channels, wherein each modulation channel has a channel capacity, thereby obtaining at least one allocated data stream;
  encoding the at least one allocated data stream for said each modulation channel using a coding rate varying as a function of the channel capacity of said each modulation channel, thereby obtaining at least one encoded data stream;
  generating a plurality of modulation symbols from the plurality of point representations, one modulation symbol per point representation; and
  transmitting the at least one encoded data stream using the plurality of modulation symbols from the transmitter.

49. The method of claim 48, further comprising:
determining the channel capacity of each modulation channel.

50. The method of claim 48, wherein n is greater than two.

51. The method of claim 48, wherein n is greater than three, and wherein the step of generating is performed in accordance with quadrature amplitude modulation (QAM), and the step of translating is performed in accordance with Gray mapping.

52. A method of receiving at a receiving device data transmitted over a physical channel from a transmitting device, the method comprising:
receiving at the receiving device data transmitted using a plurality of modulation symbols transmitted from the transmitting device, each modulation symbol of the plurality of modulation symbols generated from a plurality of point representations in a multi-dimensional constellation space, one modulation symbol per point representation, into which a signal constellation mapper at the transmitting device translated n-wide binary value sets, n being an integer, each point in the multi-dimensional constellation space representing a unique n-wide binary value set, wherein at least one data stream was allocated at the transmitting device among a plurality of modulation channels based on the channel capacity of each modulation channel of the plurality of modulation channels to obtain at least one allocated data stream, each modulation channel has a channel capacity, and the at least one allocated data stream for said each modulation channel of the plurality of modulation channels was encoded at the transmitting device with a coding rate varying as a function of the channel capacity of said each modulation channel to obtain at least one encoded data stream, and then transmitting the at least one encoded data stream using the plurality of modulation symbols from the transmitting device to the receiving device;
demodulating the modulation symbols to obtain demodulated data; and
decoding the demodulated data with the coding rate varying as a function of the channel capacity of said each modulation channel.

* * * * *